(12) United States Patent
Llanso et al.

(10) Patent No.: US 8,276,114 B2
(45) Date of Patent: Sep. 25, 2012

(54) SYSTEMS AND METHODS FOR PROVIDING HIGHER ASSURANCE SOFTWARE CONSTRUCTION VIA ASPECTS

(75) Inventors: Thomas H. Llanso, Highland, MD (US); George R. Barrett, Silver Spring, MD (US); Donna C. Paulhamus, Ellicott City, MD (US); Nathan S. Reller, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 1287 days.

(21) Appl. No.: 11/767,745

(22) Filed: Jun. 25, 2007

(65) Prior Publication Data

US 2008/0209388 A1 Aug. 28, 2008

Related U.S. Application Data

(60) Provisional application No. 60/816,456, filed on Jun. 26, 2006.

(51) Int. Cl.
*G06F 9/44* (2006.01)
(52) U.S. Cl. ......... 717/106; 717/109; 717/110; 717/113
(58) Field of Classification Search .................. 717/106, 717/109, 110, 113
See application file for complete search history.

(56) References Cited

U.S. PATENT DOCUMENTS 6,539,390 B1 * 3/2003 Kiczales et al. ............... 715/234
2005/0262561 A1 * 11/2005 Gassoway ....................... 726/22

* cited by examiner

*Primary Examiner* — Qamrun Nahar
(74) *Attorney, Agent, or Firm* — Noah J. Hayward

(57) ABSTRACT

There are provided systems and methods for integrating requirements driven security code into an application system. The security code is integrated into an application system in such a way as to make the integrated security code maintainable and traceable as the application system evolves over time.

22 Claims, 6 Drawing Sheets

400

```
<xsd:scheme xnine:xsd="http://www.w3.org/2001/XMLScheme"
    <xsd:element name="Project" type="ProjectType"/>
    <!-- A Requirements "Project" consists of a set of requirements and aspects.-->
    <xsd:complexType name="ProjectType">
        <xsd:sequence>
            <xsd:element name="Name"            type="xsd:string"/>
            <xsd:element name="Types"           type="RequirementTypes"/>
            <xsd:element name="Requirements"    type="RequirementsList"/>
            <xsd:element name="Tree"            type="RequirementsTree"/>
            <xsd:element name="Aspects"         type="AspectsList"/>
        </xsd:sequence>
    </xsd:complexType>

<!-- Each project can define its own requirements types. -->
    <xsd:complexType name="RequirementTypes">
        <xsd:sequence>
            <xsd:element name="Type" type="xsd:string" maxOccurs="unbounded"/>
        </xsd:sequence>
    </xsd:complexType>

<!-- Define a list of requirements -->
    <xsd:complexType name="RequirementsList">
        <xsd:sequence>
            <xsd:element name="Requirement"/>
            type="Requirement" minOccurs="0" maxOccurs="unbounded"/>
        </xsd:sequence>
    </xsd:complexType>

<!-- Define a requirement. -->
    <xsd:complexType name="Requirement">
        <xsd:sequence>
            <xsd:element name="Id"           type="xsd:integer"/>
            <xsd:element name="Label"        type="xsd:string"/>
            <xsd:element name="Name"         type="xsd:string"/>
            <xsd:element name="Description"  type="xsd:string" minOccurs="0"/>
            <xsd:element name="File"         type="xsd:string" minOccurs="0"/>
            <xsd:element name="Type"         type="xsd:string"/>
        </xsd:sequence>
    </xsd:complexType>
```

```
<!-- A Requirement tree defines a tree of interrelated requirements.-->
<xsd:complexType name="RequirementsTree">
    <xsd:sequence>
        <xsd:element name="Node" type="NodeType"/>
    </xsd:sequence>
</xsd:complexType>

<!-- Define a node in the tree -->
<xsd:complexType name="NodeType">
    <xsd:sequence>
        <xsd:element name="Id"           type="xsd:integer"/>
        <xsd:element name="AspectId"     type="xsd:integer" minOccurs="0"/>
        <xsd:element name="Rationale"    type="xsd:string" minOccurs="0"/>
        <xsd:sequence>
            <xsd:element name="Node" type="NodeType"
                    minOccurs="0" maxOccurs="unbounded"/>
        </xsd:sequence>
    </xsd:sequence>
</xsd:complexType>

<!-- Define a list of aspects -->
<xsd:complexType name="AspectsList">
    <xsd:sequence>
        <xsd:element name="Aspect" type="Aspect" minOccurs="0"
maxOccurs="unbounded"/>
        </xsd:sequence>
    </xsd:sequence>
</xsd:complexType>

<!-- Define an aspect -->
<xsd:complexType name="Aspect">
    <xsd:sequence>
        <xsd:element name="Id"           type="xsd:integer"/>
        <xsd:element name="Name"         type="xsd:string"/>
        <xsd:element name="Label"        type="xsd:string"/>
        <xsd:element name="Description"  type="xsd:string" minOccurs="0"/>
        <xsd:element name="File"         type="xsd:string" minOccurs="0"/>
    </xsd:sequence>
</xsd:complexType>
</xsd:scheme>
```

FIG. 4B

SYSTEMS AND METHODS FOR PROVIDING HIGHER ASSURANCE SOFTWARE CONSTRUCTION VIA ASPECTS

CROSS-REFERENCE TO RELATED APPLICATIONS

This application claims the benefit of prior filed U.S. application Ser. No. 60/816,456, filed on Jun. 23, 2006, the entirety of which is hereby incorporated by reference.

BACKGROUND OF THE INVENTION

1. Field of the Invention

The present invention relates generally to the field of security requirements in software systems and, more particularly, to methods and systems for implementing security requirements into application code.

2. Description of the Related Art

Security evaluations for software systems can be time consuming and expensive endeavors. In particular, the tracing of security requirements into code and the accurate maintenance of that mapping as a system evolves over time can be tedious and error-prone. It has been generally recommended to those who wish to have secure systems that they should integrate the required security functionality into their system designs at the earliest possible stages of the process. However, even when the full complement of security requirements are known in advance, the manner in which security functionality is traditionally integrated, which is via largely manual methods, can cause its own problems. Such problems can make assurance claims more difficult to support and result in systems which are more difficult to understand, evolve, and ultimately to certify and accredit from a security perspective.

In a typical process, the integration of software functionality into a software application adheres to the following general approach. First, a risk analysis is performed to determine threats and a likelihood of realizing those threats based on a characterization of the adversary. Second, security requirements are documented for the system to counter selected threats. Third, appropriate software security mechanisms are selected to meet the requirements established at the second step and minimize the vulnerabilities to the threats. Fourth, the security mechanisms are integrated throughout the system under construction. Lastly, the system is tested and results are documented for stakeholders, such as security evaluators and accreditors. The described process may be repeated as the system, the information processed, and risks evolve over time. It should be appreciated that the described process can be difficult to realize with precision in the real world.

The present invention addresses the fourth step of integrating security mechanisms throughout the system. It is at this step where certain difficulties can occur. One problem is that developers may lack the expertise to integrate security mechanisms in a proper fashion. In addition, many types of security functionality permeate the various parts of a complex application, with different software application developers responsible for those different parts. As the various developers implement similar security code in different places throughout the system, classic "code scattering" and "code tangling" problems often result, thus complicating evolution and tracking of such security mechanisms (i.e., code). These problems are typical of functionality that cuts across systems. Code scattering refers to like functionality which is needed across a system. References to such functionality show up in numerous places, complicating the maintenance/evolution of such code. Code tangling refers to such functionality becoming necessarily mixed in with code whose main purpose is to accomplish some goal unrelated to security.

Another consequence of the difficulty of integrating security mechanisms into application code is demonstrating to a security evaluator that such integration clearly maps back to original security-related requirements derived from the risk analysis. It can be easy for developers to miss integration points entirely; this is especially true as new code is added to a system subsequent to the initial integration of security countermeasures. Furthermore, should the details of a security mechanism's invocation change, developers are forced to revisit all the different places in the system where such invocations occur, with the consequence that certain updates may be missed.

As one example, consider an access control check in a finance application implemented as a service-oriented architecture. One might have access control checks for a wide variety of actions within such a system, from viewing certain reports, to updating accounting entries, exporting data to other systems, and performing system maintenance procedures. Suppose, for example, that there are twenty services in the architecture, six operations/service which require an access control check, and two lines of code per access control check. The result is an additional 240 lines of code (LOC) in the system to ensure that access control checks are invoked where needed. Such code is replicated across 120 distinct places (code scattering) where the operations are implemented. Furthermore, the focus of each operation is not access control but some other goal, such as report generation, so authorization checking code is mixed in with application code (code tangling). Besides access control, other common security tasks may include, logging/time-stamping/auditing, authentication checks, "just-in-time" encryption and decryption, message authentication code and signature generation and verification, locking and unlocking of critical data structures, session time-out checks, and assertion checks. In any given application function, multiple of these security tasks may be present, further exacerbating code scattering and code tangling problems.

Using the above example but expanding the average number of security-related tasks to five per service operation, the total lines of security-related code that are scattered/tangled rises to 1,200 LOC. This calculation only accounts for top-level services and ignores similar code in underlying software layers and supporting class libraries.

The security functionality described above is just one example of what are known as "cross cutting concerns" (CCCs). CCCs represent functionality found throughout systems that are difficult to modularize using traditional programming languages, including object-oriented languages, resulting in the code scattering and tangling properties discussed above.

SUMMARY OF THE INVENTION

Therefore, the present invention has been made in view of the above problems. Accordingly, the present invention provides computer-implemented methods and systems for integrating requirements driven security code into an application system. The security code is integrated into an application system in such a way as to make the integrated security code maintainable and traceable as the application system evolves over time.

According to one aspect of the invention, integration of security code into a code base of an application system comprises tagging various language-level constructs of the code base, such as classes, methods and instance variables, using annotation mechanisms. In this usage, each annotation label unambiguously maps code which implements a security requirement to target application code in which the security code is to be integrated. The tagging process itself is preferably performed in an automation-assisted manner. Annotations are tagged to the application code base in accordance with the tagging process to provide an accurate mapping of security code in the aspects to the application code base where security requirements must be met. The annotation mechanisms represent a form of meta-data.

According to a related aspect of the invention, a software tool is provided to allow a developer to quickly label various language-level constructs with annotations in an automation-assisted manner. The various language-level constructs are quickly labeled with the annotations described above with the assistance of simple search wizards. That is, after a programmer identifies where the files containing the source code reside, the programmer can then iteratively enter search keywords. The software tool then finds matches within the identified code base. The programmer can review these matches, one by one, and indicate to the software tool whether the code should be "branded" with an annotation or not.

In one embodiment, the software tool consists of a four-paneled window, where the window represents a particular software development "project". As will be described in greater detail below, the first (left-most) panel shows a listing of security requirements. A second panel shows the same security requirements listed in a hierarchical form, a third panel shows a list of aspects, which represent a new form of code modularity that is orthogonal to traditional classes in object-oriented languages. Each aspect contains code that meets a security requirement.

A primary advantage provided by the invention is a process for raising the assurance level of software via clear traceability of security requirements to security code, and an unambiguous mapping of security code to target application code base. Another related advantage of the invention is in lowering the cost and expense of security evaluations with the rationale that security evaluators can now very clearly trace security requirements into code and back again, even as security requirements and the application code base evolve over time. Other ancillary advantages include a reduction of code bulk, ease of maintenance, and improved separation of duties between security developers and application code developers, assisting developers to integrate cross-cutting concerns more effectively, reduce time and expense of conducting security evaluations by reducing the amount of security-critical code to be evaluated and showing up-to-date traceability from security requirements to security-critical functions implementation.

As will be apparent, the present invention may generally benefit security analysts/security software developers and application developers by streamlining the coordination of integrating security related requirements into application code. The present invention may also benefit security evaluators for reasons described above. Other beneficiaries include system evaluators/certifiers, and system accreditors.

BRIEF DESCRIPTION OF THE DRAWINGS

These and other objects, features and advantages of the invention will be apparent from a consideration of the following Detailed Description Of The Invention considered in conjunction with the drawing Figures, in which:

FIG. 4 is a listing of exemplary XML Schema which may be used to create the underlying XML file, according to one embodiment;

DETAILED DESCRIPTION OF THE PREFERRED EMBODIMENTS

1. Introduction

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

It should be appreciated that the present invention can be implemented in numerous ways, including as a process, an apparatus, a system, a device, a method, or a computer readable medium such as a computer readable storage medium or a computer network where program instructions are sent over optical or electronic communication links. Several inventive embodiments of the present invention are described below.

The following paragraphs describe an overview of the invention and a software tool for storing and executing software in accordance with an illustrative embodiment of the invention.

2. Overview

In accordance with the present invention, there are provided herein methods and systems for integrating requirements-driven security code into an application system. The methods and systems facilitate the traceability of software requirements from their initial declaration to their implementation in code to the integration of that code into an existing target application software code base. Software requirement traceability is facilitated in part by aspect-oriented programming and programming language annotation mechanisms. A key advantage of providing such traceability is to assist security evaluators, security developers, application developers and other stakeholders to gain confidence that security requirements have been met.

Figure 1:
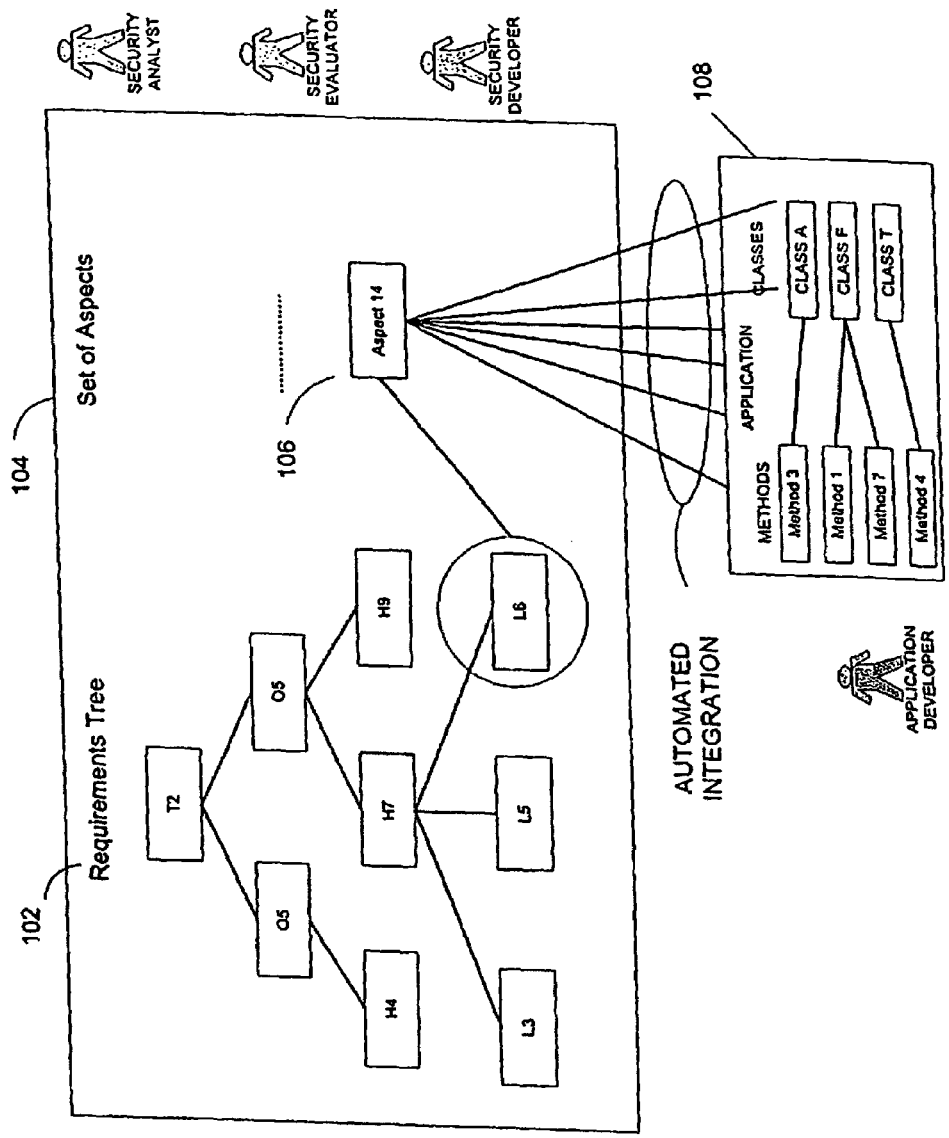
FIG. 1 is a diagram of a process directed to the automation-assisted integration of requirements-driven security functionality into an existing software application code base.

Referring now to the drawings, FIG. 1 provides a process overview of a process directed to the automation-assisted integration of requirements-driven security functionality into an existing software application code base.

FIG. 1 illustrates in the upper left hand corner, a requirements tree 102. The requirements tree 102 comprises a set of security-related requirements for a software application (i.e., "project") based on a risk/threat analysis.

Generally, the integration of security functionality into a software application begins by performing a risk/threat analysis to determine threats and the likelihood of the realization of threats. An experienced security analyst considers potential threats to information confidentiality, integrity and availability. The analyst then assesses the likelihood and impact of such threats being realized and how those threats should be addressed in the context of a given environment in order to minimize vulnerabilities. Next, the analyst develops a strategy for handling the identified threats. All threats deserve scrutiny, with particular attention to those threats believed to be of higher likelihood and impact to the organization. Common responses to threats are: ignore the threats (i.e., absorb any losses), indemnify oneself from the threat (e.g., purchase insurance), and/or adopt active countermeasures to lower the risk of the threat being realized. The present invention addresses this last option, namely, the adoption of active countermeasures to lower the risk of the threat being realized.

Continuing with FIG. 1, the requirements tree 102 is illustrated in a hierarchical form, with a security threat (T) implying the need to meet certain high level security objectives (O), which lead to higher and lower level security requirements (H) and (L). It is noted from the hierarchically organized requirements tree 102 that the lower level requirements (L) may appear in different parts of the same hierarchical depiction.

Security analysts and security developers work together to identify which security requirements (e.g., L6) from the requirements tree require that code be implemented to meet the requirement. The security developer then creates an aspect (e.g., aspect 14 (106)) for each of the identified requirements. Working with application developers, the security developer then marks via marker annotations those places (e.g., certain methods in certain classes) in the application code bases where the code from each aspect is required to be inserted. The actual insertion is itself an automated process carried out by the aspect pre-compiler or compiler.

Figure 2:
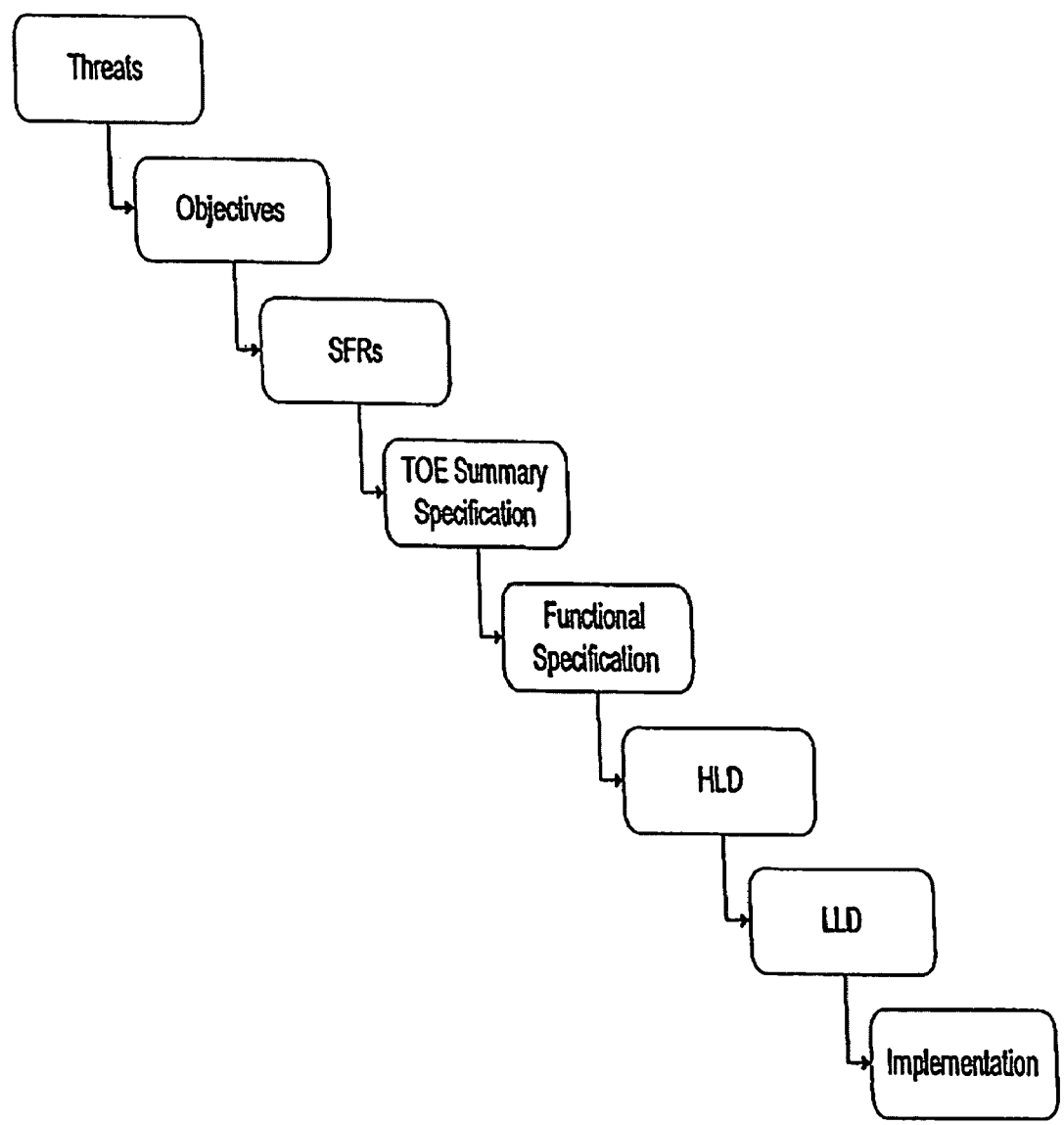
FIG. 2 is a diagram illustrates there is shown a common requirements decomposition scheme found in Common Criteria, which the process, as depicted in FIG. 1, can support.

With reference now to FIG. 2, there is shown a common requirements decomposition scheme 200 found in Common Criteria, which the process, as depicted in FIG. 1, can support. Common Criteria is well known to those knowledgeable in the art as an international standard for describing a framework for representing security requirements. The common requirements decomposition scheme 200, sometimes referred to as a traceability mapping, illustrates one particular way in which security requirements may be structured. In other words, it provides a design trace from security threats to the various places in code where an aspect could be integrated. It should be appreciated that other evaluation approaches for measuring software assurance may be used. However, the Common criteria decomposition scheme 200 is illustrated in the instant example, given that it is an internationally recognized evaluation approach for measuring software assurance.

Due to the afore-mentioned cross-cutting nature of security requirements in a system, so-called aspects, which are well known to those knowledgeable in the computer arts, are abstraction mechanisms which are typically added as extensions to existing object-oriented programming languages, as an implementation strategy for capturing code for the implementation of cross cutting concerns, of which security requirement implementation is an example. More particularly, aspects are typically used in conjunction with standard aspect predicate matching to automatically integrate the aspect code into the application code base. For example, with reference again to FIG. 1, "Aspect 14" is created to implement security requirement L6. A problem arises, however, in that a common approach to identifying the various places in code where an aspect could be integrated, known as join points, is usually done by certain search predicate expressions, known as pointcuts. Different aspect languages offer different facilities with respect to how one specifies pointcuts, but a general concern is the matching accuracy, or lack thereof, of such pointcut expressions.

By way of reference, a pointcut is a structure of an aspect language that denotes a set of so called joinpoints. A joinpoint is a place in program execution where an aspect component (AC) needs to be integrated. The aspect component represents a segment of code which addresses a particular security requirement at a specific jointpoint. Hence, by defining a pointcut for an AC, one defines the locations where an AC is to be woven by a pointcut weaver. Different aspect languages offer different facilities with respect to how one specifies pointcuts, but a general concern is the accuracy of such pointcut expressions. Such expressions may overshoot, i.e., include certain integration points where functionality is not needed, or undershoot, i.e., miss certain integration points where function is needed. The inventor has overcome this problem by deriving a method to increase the accuracy of the aspect-to-code mapping problem. Specifically, the inventor has proposed to simplify pointcut expressions via the use of annotations. Languages such as Java and C# now support the addition of annotations at the source code level. Annotations provide the ability to supply meta-data to describe various language level constructs, such as classes and methods, for a variety of purposes. The simplest form of annotation is a "marker annotation" which simply associates an identifier with a language level construct. The inventor has recognized that marker annotations may be leveraged as a means to accurately map aspects into code via pointcuts. This is illustrated as follows.

The following code segment, illustrates, by way of example and not limitation, how to create a simple annotation, called a marker annotation in Java 5. The method "someMethod( )" of class "SomeClass" requires that an authentication check be made as part of its implementation. In the present example, AuthenticationCheck( ) represents the marker annotation which is associated with the language level construct, the Public class, "SomeClass".

```
Public @interface AuthenticationCheck( )
......
Public class SomeClass {
    @AuthenticationCheck
    Void someMethod ( ) (....)
......
}
```

Hence, automated integration is ideally realized via such marker annotations due to their pinpoint accuracy, assuming the selection of unique names for the marker annotations. Note that it is necessary, of course, for security developers and application developers to coordinate on the places in the application code (e.g., certain methods of certain classes). However, once those places have been identified, marker annotations can provide an accurate mapping of aspects into such code.

3. Software Tool

According to one aspect, the present invention provides a software tool to allow a developer to quickly label various language-level constructs with marker annotations in an automation-assisted manner. In a preferred embodiment, the software tool generally operates by identifying various language-level constructs using a search wizard to quickly label the various language-level constructs with the marker annotations. In other words, after a programmer identifies where the files containing the application source code reside, the programmer can then iteratively enter search keywords. The programmer, using the search wizards, finds matches by iteratively searching through the application code base. The programmer can manually review the resulting matches one by one, and indicate to the software tool whether the application code in question should be "branded" with the respective marker annotation or not.

The labeling operation performed by the software tool occurs as a necessary foundational step to facilitate the next sequential process during which security code (previously created aspects) is weaved into the application code. Note, however, that this weaving process is not performed by the software tool, but is instead performed using an aspects add-on (e.g., AspectJ) to the software development environment which a developer uses in conjunction with a programming language compiler. In various embodiments, AspectJ can be a program invoked via a command line, or may otherwise be added into an Integrated Development Environment (IDE) via a plug-in.

Figure 3:
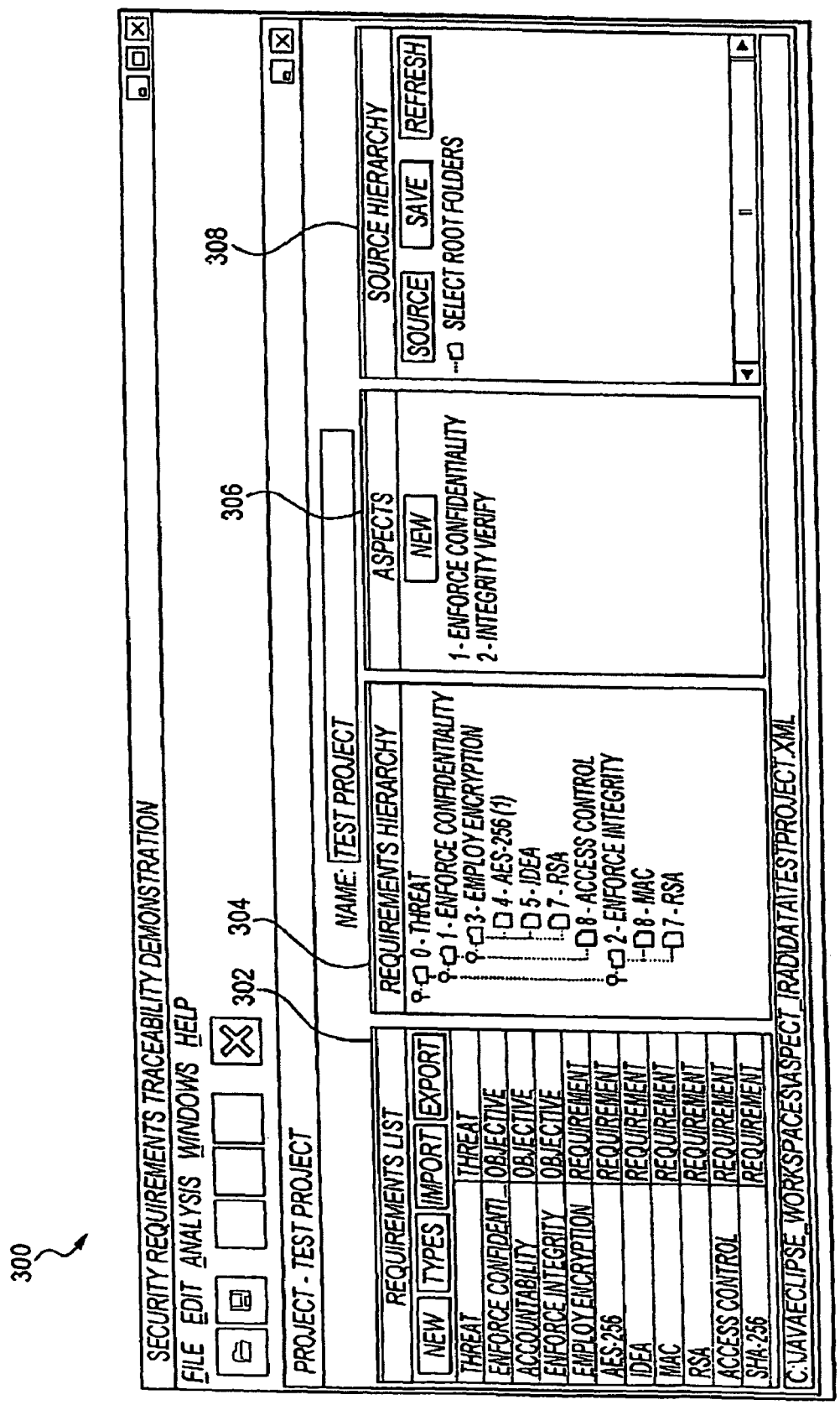
FIG. 3 there is shown a snapshot of a typical GUI interface 300 of the software tool of the invention.

Referring now to FIG. 3, there is shown a snapshot of a typical GUI interface 300 of the software tool of the invention, according to one embodiment. The GUI interface 300 is divided into four general regions 302, 304, 306 and 308 to be described as follows.

GUI—First Screen Region 302

A first screen region 302 of the GUI interface 300 corresponds to the left-most pane of the GUI 300. This first region 302 is a data entry area allowing a user (i.e., security program person) to enter or import security requirements into the software tool.

GUI—Second Screen Region 304

A second screen region 304 of the GUI interface 300 allows the user to relate the requirements entered in the first screen region 302 See FIG. 3 for labeling of screen regions in a hierarchical fashion. While the first screen region 302 is a simple linear list, a programmer, using the second screen region forms a hierarchy based on a relationship that the programmer knows about the security requirements. For example, knowing to place lower level requirements beneath higher level requirements. It is noted that a given requirement in the left-most panel can appear more than once in the resulting hierarchy.

Third Screen Region 306

A third screen region 306 of the GUI interface 300 is used to identify aspects that should be developed by a security software developer to be made available to implement the security requirements identified in the first screen region 302. In the present embodiment, the aspects are created external to the software tool, however, it is contemplated to integrate the creation of aspects within the tool in other embodiments.

By double-clicking the mouse on a requirement in the second screen region 304, a dialog box appears (not shown) which allows the developer to identify the aspect that implements the requirement. The dialog box consists of an optional "rationale field" to explain the reason that a requirement exists in the hierarchy displayed in the second screen region 304. The dialog box is followed by a drop-down list box, displayed to the user, which lists all of the aspects from the aspects list. The programmer simply selects the aspect corresponding to the requirement that was previously clicked on. Otherwise, the programmer leaves the aspect list box on the default selection of "Not Selected". By double-clicking the mouse on an aspect, a dialog box appears that has various tabs. One tab describes the aspect overall (e.g., its name, description, and unique identifier). Another tab allows the user to search an identified code base for places in the source code that should be marked with a marker annotation. The marker annotation identifies that the corresponding aspect should be automatically integrated into the code Fourth Screen Region 308

A fourth screen region 308 of the GUI interface 300 is used to allow the programmer to identify the location of the application code base into which the aspects will be automatically woven based on the marker annotations.

Compilation

Finally, the programmer compiles the system, taking care to employ the appropriate aspect preprocessor to carry out the automatic weaving of the aspects into the application code base.

XML File

The software tool stores all the information on a "project" in an underlying XML file, which only includes meta-data defining the elements to name the requirements and their types, meta-data relating the requirements to one another and to an implementing aspect, and an enumeration of the aspects themselves. It should be understood, however, that the XML file does not contain the code for the aspect; such code resides in ordinary source code files.

FIG. 4 is a listing of exemplary XML Schema which may be used to create the underlying XML file, according to one embodiment. In other words, the XML Schema spells out the rules for how the underlying XML file is to be properly formed. An XML parser in the tool automatically checks XML files against the Schema for proper structure.

4. Operational Flow

Figure 5:
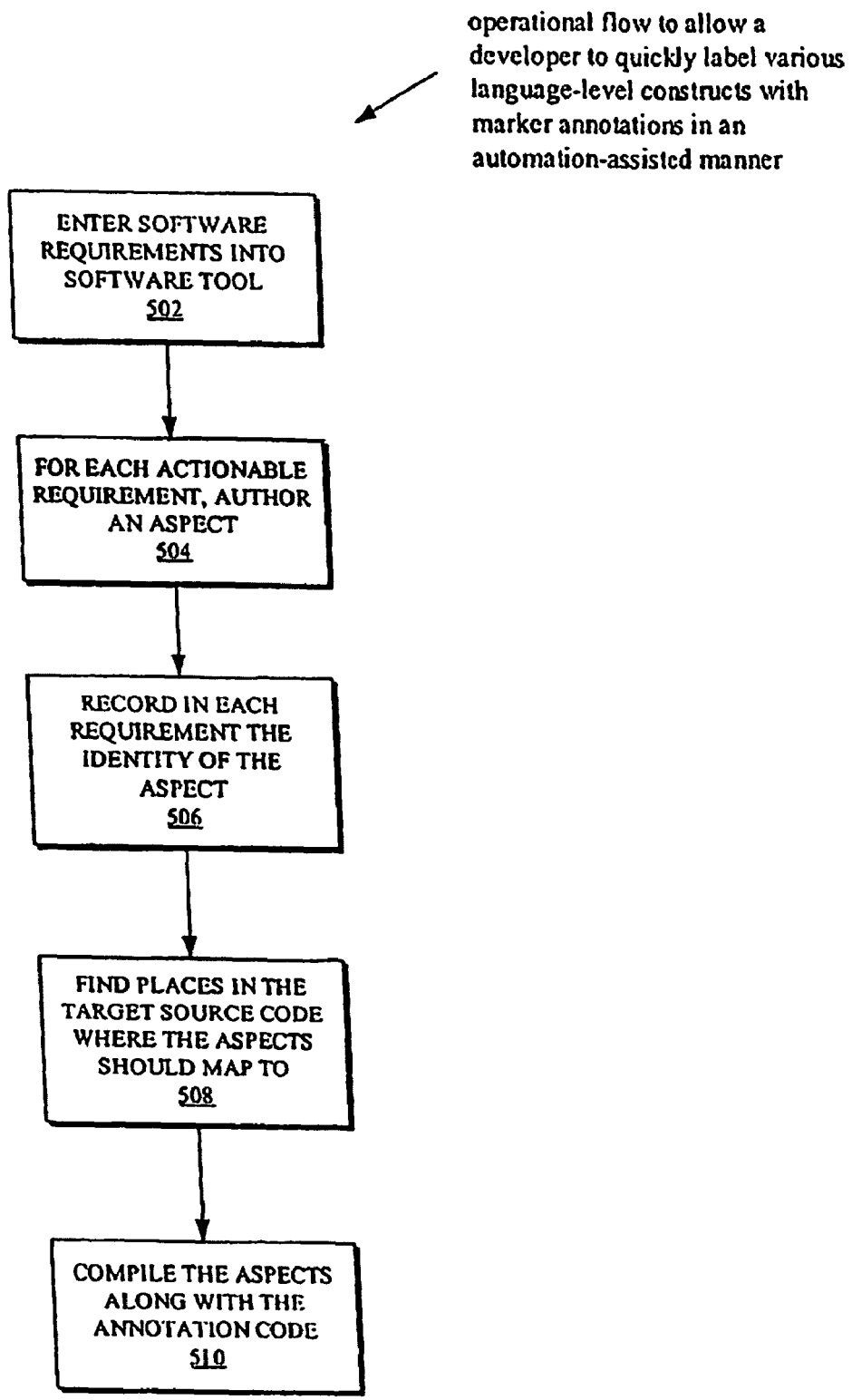
FIG. 5 is a flow diagram illustrating an exemplary operational flow of the software tool, according to one embodiment.

FIG. 5 is a flow diagram illustrating an exemplary operational flow 500 of the software tool to allow a developer to quickly label various language-level constructs with marker annotations in an automation-assisted manner according to one embodiment.

Operational flow 500 begins at step 502 where a collection of related security requirements for a system are entered or imported into the software tool, referred to above.

Next, at step 504, for each "actionable" requirement (some requirements are not directly implemented, such as requirements located close to the root of the requirements tree), author an aspect that implements the code for the requirement. In the present embodiment, the authoring of aspects occurs outside of the scope of the software tool. In this manner, a programmer may use a software development environment that includes an aspect add-on, such as, for example, Eclipse™ with AspectJ. As stated above, it is also contemplated to author aspects within the software tool environment.

At step 506, for mapping purposes, record in each requirement the identity of the respective aspect that implements the requirement. A requirement node in the hierarchy of the second screen region 304 includes a field that identifies the implementing aspect, if there is one.

Next, at step 508, find places in the target source code base where the aspects created above should map. To do this, use an automated search function to assist in such searching. Mark each place in the target source code base with the marker annotation whose name corresponds to the aspect.

Lastly at step 510, compile the aspects along with the annotation code. The aspect compiler (e.g., AspectJ), referred to above, will automatically weave the aspect code into the application code based on the names in marker annotations matching to markers identified by programmers in the aspects themselves. It should be understood once again, that the software tool itself doesn't perform this step. The programmer carries out this step outside of the software tool using the appropriate software development tools for the given environment.

While the invention has been described with reference to an example embodiment, it will be understood by those skilled in the art that a variety of modifications, additions and deletions are within the scope of the invention, as defined by the following claims.

What is claimed is:

1. A computer-implemented method for integrating requirements driven security code into an application system, the method comprising:
   identifying one or more security requirements;
   assigning unique marker annotations to each of said one or more identified security requirements;
   performing a first mapping of said one or more identified security requirements to aspects that implement the identified one or more security requirements;
   marking each of said aspects with a unique marker annotation that uniquely matches a corresponding security requirement that the aspect implements in accordance with said first mapping;
   performing a second mapping of each of said aspects to an application code base comprising marking code in the application code base using the unique marker annotations at insertion points in the application code base where each of said aspects are to be woven;
   inserting said unique marker annotations into said application code base based on said second mapping; and
   weaving said aspects into said application code base at said insertion points identified by said unique marker annotations to provide a precise and traceable mapping between said one or more security requirements and said application code base.

2. The computer-implemented method of claim 1, wherein said step of inserting annotations is free of undershoot and overshoot concerns.

3. The computer-implemented method of claim 1, wherein said step of identifying one or more security requirements, further comprises:
   performing a security risk analysis; identifying said security requirements based on selected threats included in said security risk analysis,
   wherein said security requirements are sufficient to counter said selected threats in the security risk analysis.

4. The computer-implemented method of claim 1, wherein said security risk analysis is based on at least one of an adversary characterization, an environment of mission, a mission and sensitivity of mission information.

5. The computer-implemented method of claim 1, wherein the step of performing a first mapping of said one or more identified security requirements to aspects, further comprises: creating an aspect corresponding to each of said one or more identified security requirements.

6. The computer-implemented method of claim 1, wherein said security requirements are organized in a hierarchical requirements tree comprised of one or more security threats (T) at a highest level, each of said security threats (T) having one or more corresponding security objectives (O) at a next lower level, each of said security objectives (O) having one or more corresponding higher (H) and lower (L) level security requirements at a next lower level.

7. The computer-implemented method of claim 1, wherein the step of performing a second mapping of said aspects to an application code base via annotations, further comprises:
   performing a keyword search on said application code to match keywords to code included in said application code base, wherein said keywords are selected based on a knowledge of the application code base;
   reviewing matches resulting from said keyword search to identify those matches requiring the implementation of a security requirement; inserting said annotations at insertion points in said application code at points corresponding to those reviewed matches requiring the implementation of a security requirement.

8. The computer-implemented method of claim 1, wherein said annotations serve as insertion markers for identifying said insertion points at which said aspects are weaved into said application code in accordance with said weaving step.

9. The computer-implemented method of claim 1, wherein said insertion points correspond to language level constructs of said application code.

10. The computer-implemented method of claim 1, wherein said weaving step is performed by invoking a preprocessor.

11. A computer program embodied on a non-transitory computer-readable medium that includes a program that, when executed by a processor, causes the processor to quickly label various language-level constructs of an application code base with marker annotations in an automation-assisted manner, the processor executing various code segments of the program including:
    a code segment for entering a set of actionable and non-actionable security requirements;
    a code segment for authoring an aspect for each actionable security requirement;
    a code segment for recording in each actionable requirement, an identity of the aspect;
    a code segment for locating places in the application code base where the aspects should map to, said code segment comprising means for marking each of said aspects with a unique marker annotation that uniquely matches a corresponding security requirement that the aspect implements in accordance with a first mapping;
    performing a second mapping of each of said aspects to an application code base comprising marking code in the application code base using the unique marker annotations at insertion points in the application code base where each of said aspects are to be woven;
    inserting said unique marker annotations into said application code base based on said second mapping; and
    weaving said aspects into said application code base at said insertion points identified by said unique marker annotations to provide a precise and traceable mapping between said one or more security requirements and said application code base.

12. The computer program of claim 11, wherein the code segment for locating places in the application code base where the aspects should map to further comprises: utilizing an automated search function to assist in locating the places in the application code base where the aspects should map to.

13. A computer program embodied on a non-transitory computer-readable medium that includes a program that, when executed by a processor, causes the processor to quickly label various language-level constructs of an application code base with marker annotations in an automation-assisted manner, the processor executing various code segments of the program including:
  a code segment for entering a set of actionable and non-actionable security requirements;
  means for retrieving code segments corresponding to authored aspects for each actionable security requirement;
  a code segment for recording in each actionable security requirement, an identity of the authored aspect;
  a code segment for locating places in the application code base where the aspects should map to comprising marking each of said aspects with a unique marker annotation that uniquely matches a corresponding security requirement that the aspect implements in accordance with a first mapping;
  performing a second mapping of each of said aspects to an application code base comprising marking code in the application code base using the unique marker annotations at insertion points in the application code base where each of said aspects are to be woven;
  inserting said unique marker annotations into said application code base based on said second mapping; and
  weaving said aspects into said application code base at said insertion points identified by said unique marker annotations to provide a precise and traceable mapping between said one or more security requirements and said application code base.

14. The computer program of claim 13, wherein the code segment for locating places in the application code base where the aspects should map to further comprises: utilizing an automated search function to assist in locating the places in the application code base where the aspects should map to.

15. A system for integrating requirements driven security code into an application system, the system comprising:
  a processor;
  a memory connected to the processor and storing instructions for operating the processor to perform the steps of:
  identifying one or more security requirements;
  assigning unique marker annotations to each of said one or more identified security requirements;
  performing a first mapping of said one or more identified security requirements to aspects that implement the identified one or more security requirements;
  marking each of said aspects with a unique marker annotation that uniquely matches a corresponding security requirement that the aspect implements in accordance with said first mapping;
  performing a second mapping of each of said aspects to an application code base comprising marking code in the application code base using the unique marker annotations at insertion points in the application code base where each of said aspects are to be woven;
  inserting said unique marker annotations into said application code base based on said second mapping; and
  weaving said aspects into said application code base at said insertion points identified by said unique marker annotations to provide a precise and traceable mapping between said one or more security requirements and said application code base.

16. A system according to claim 15, wherein said means for identifying one or more security requirements, further comprises:
  means for performing a security risk analysis based on at least one of adversary characterization, environment of mission, mission and sensitivity of mission information; and
  means for identifying said security requirements based on selected threats included in said security risk analysis, wherein said security requirements are sufficient to counter said selected threats in the security risk analysis.

17. A system according to claim 15, wherein said means for performing a first mapping of identified security requirements to aspects, further comprises: means for creating an aspect corresponding to each of said one or more identified security requirements.

18. A system according to claim 15, wherein the means for performing a second mapping of said aspects to an application code base, further comprises:
  performing a keyword search on said application code to match keywords to code included in said application code base, wherein said keywords are selected based on a knowledge of the application code base;
  means for reviewing matches resulting from said keyword search to identify those matches requiring the implementation of a security requirement; and
  means for inserting marker annotations at insertion points in said application code at points corresponding to those reviewed matches requiring the implementation of a security requirement, wherein said inserted marker annotations serve as insertion points for weaving said aspects in accordance with said weaving step.

19. A system according to claim 15, wherein said means for identifying one or more security requirements, further comprises:
  means for displaying said security requirements in a hierarchical requirements tree comprised of one or more security threats (T) at a highest level, each of said security threats (T) having one or more corresponding security objectives (O) at a next lower level, each of said security objectives (O) having one or more corresponding higher (H) and lower (L) level security requirements at a next lower level.

20. A system according to claim 15, wherein said insertion points correspond to language level constructs of said application code.

21. A generic graphical user interface embodied on a non-transitory computer-readable medium that includes a program that, when executed by a processor, causes the processor to quickly label various language-level constructs of an application code base with marker annotations in an automation-assisted manner, the graphical user interface comprising:
  a menu bar providing access to graphical user interface functionality, the menu bar including a file menu for creating a new project or opening an existing project,
  an analysis menu including reporting means for displaying a report of a project in a report style,
  a title display area identifying a file including the application code base being labeled;
  a first data pane for allowing a user to enter or import security requirements;
  a second data pane for allowing the user to relate the requirements entered in the first data entry pane in a hierarchical fashion;
  a third data pane for identifying aspects to be developed by a security software developer to be made available to implement the security requirements identified in the first data pane;
  marking each of said aspects with a unique marker annotation that uniquely matches a corresponding security requirement that the aspect implements in accordance with said first mapping;
  performing a second mapping of each of said aspects to an application code base comprising marking code in the application code base using the unique marker annotations at insertion points in the application code base where each of said aspects are to be woven;

inserting said unique marker annotations into said application code base based on said second mapping; and weaving said aspects into said application code base at said insertion points identified by said unique marker annotations to provide a precise and traceable mapping between said one or more security requirements and said application code base.

22. A generic graphical user interface as claimed in claim 21, wherein the data entry pane comprises
  a tab for importing said security requirements,
  a tab for entering said security requirements, and
  a types tab for defining a security requirement type.

* * * * *